United States Patent Office 3,446,691
Patented May 27, 1969

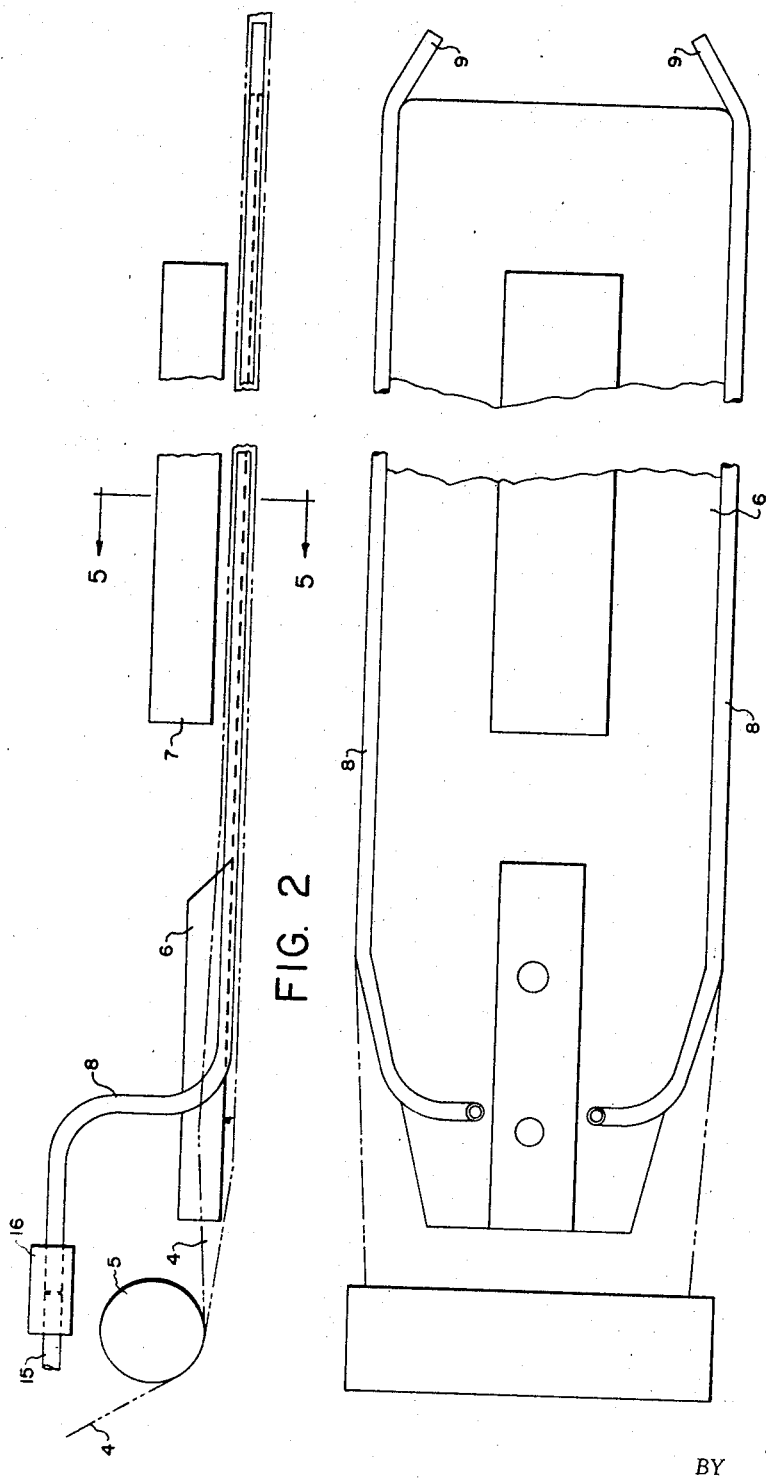

3,446,691
APPARATUS FOR FORMING, HEAT SEALING, AND INTRODUCING ANTI-BLOCKING POWDER INTO PLASTIC TUBES
John Mundie, Toronto, Ontario, Canada, assignor to Tee-Pak of Canada, Limited, Toronto, Ontario, Canada, a corporation of Canada
Filed Oct. 21, 1965, Ser. No. 499,534
Int. Cl. B29d 23/10
U.S. Cl. 156—466          3 Claims

ABSTRACT OF THE DISCLOSURE

An improved apparatus for forming plastic film into tubular form which includes a forming plate, means to feed plastic film and fold the same around said plate to form a longitudinally extending lap joint, and means to form a heat seal in said lapped joint, includes one or more conduits extending along the forming plate and arranged to conduct an anti-blocking powder past the forming plate to introduce said powder within the formed plastic tube beyond the heat sealing means.

---

Figure 1:
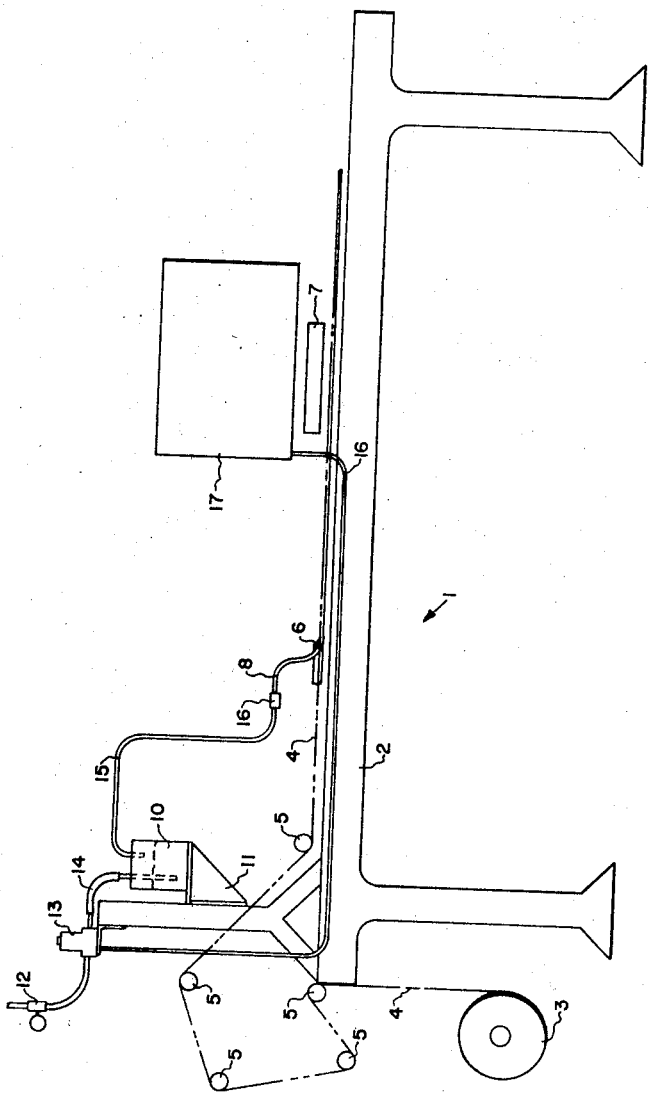

This invention relates to new and useful improvements in apparatus for forming tubes from plastic films and more particularly to a plastic film sealing apparatus having an improved mechanism for applying an anti-blocking powder within a plastic film tube or package.

Over a period of several years, plastic film has come into widespread use for a large variety of packaging purposes. Plastic film is used in wrapping various objects for packaging but is most commonly used in the form of tubes or preformed packages. In the manufacture of tubes and packages from plastic film, tubular film is often used as a starting material. If film tubes are desired for packaging purposes, then extruded plastic tubes are merely cut into a desired length for packaging. Where separate packages are desired, tubular plastic film may be heat sealed to close one end of a tube to form an open ended package.

While tubular plastic films have been used for a variety of packaging purposes, there are many instances where it is more convenient and cheaper to start with single or double thickness film in the form of flat rollstock. Where packaging tubes are desired, rollstock is fed into an apparatus wherein it is lapped to form a tube and the lapped joint heat sealed continuously along the joint. If a seamed tube of this type is desired for packaging it is merely cut into suitable lengths. If it is desired to form closed end packages, then the seamed tube is divided with laterally extending seams which divided the tube into packages. This method or formation of seamed tubes and seamed packages is effective for all types of heat sealable plastic films, such as saran, nylon, polyethylene, polypropylene, polyvinyls, etc.

Many plastic films, such as, polyvinyl chloride, rubber hydrochloride, saran, surface oxidized polyethylene, etc., have a tendency to stick to themselves when formed into tubes or packages with the result that the tubes or packages are difficult to open. To avoid this tendency of films to stick or block, the films are usually treated with an anti-blocking agent, such as, a fine powder, e.g., starch, chalk, etc. The application of the anti-blocking powder to films has usually been accomplished at the time the film is unwound from a reel and prior to the time that it is heat sealed to form a tube or package. This application of an anti-blocking powder has usually resulted in an excessive amount of dust in the area of the tube-forming or package-forming apparatus and has often resulted in the anti-blocking powder contaminating the heat sealing apparatus and sometimes producing incomplete plastic seals due to the difficulty of obtaining complete fusion of the plastic films through a layer of the anti-blocking powder.

Accordingly, it is one object of this invention to provide a new and improved method and apparatus for forming plastic film into tubes and/or packages which does not require the application of an anti-blocking powder to the film as it is unwound and fed into the tube-forming or package-forming apparatus.

Another object of this invention is to provide a new and improved apparatus and method for formation of tubes and packages from plastic films in which the packages or tubes are formed with more effective seals.

A feature of this invention is the provision of the new and improved method and apparatus for formation of plastic film into tubes or packages in which the tubes or packages are provided with an anti-blocking agent which is applied after the tube or package is formed.

Other objects and features of this invention will become apparent from time to time throughout the specification and claims as hereinafter related.

This invention comprises a new and improved method and apparatus for the formation of plastic film into tubes or packages. The plastic film is unrolled from a storage reel in the form of flat reelstock and is lapped to form a tube and the lapped joint heat sealed. If desired, the tubes may be provided with a cross seam to form packages which are subsequently cut apart or otherwise separated. When tubes or packages are formed in accordance with this invention, the interior of each tube or package is dusted with an anti-blocking powder, such as, starch, chalk, talc, etc., which is applied within the package after all of the heat seals are completed.

In the accompanying drawing, to be taken as a part of this specification, there is clearly and fully illustrated a preferred embodiment of this invention, in which drawing, FIG. 1 is a somewhat diagrammatic view in side elevation of the overall assembly of a new and improved apparatus for forming plastic film reelstock into tubes or packages and including an improved arrangement for application of an anti-blocking powder to the packages after the heat seals are completed, FIG. 2 is a detail view in side elevation of the heat sealing portion of the apparatus shown in FIG. 1.

Figure 5:
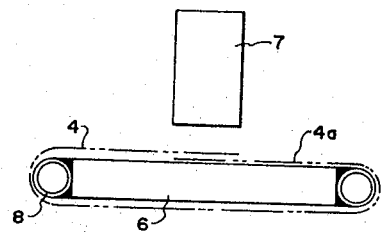
Figure 4:
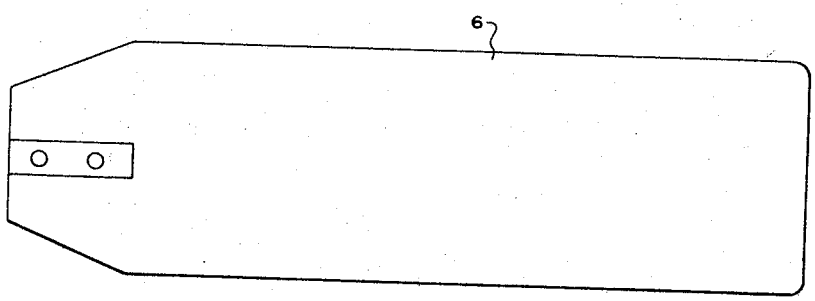

FIG. 3 is a detail plan view of the heat sealing portion of the apparatus shown in FIG. 2, FIG. 4 is a detail plan view of the heat sealing portion of the apparatus as used in the prior art, and FIG. 5 is a view in cross section, somewhat diagrammatic, taken on the line 5—5 of FIG. 2 and showing the relationship of the heat sealer to the plastic film and the forming plate of the apparatus.

Referring to the drawings by numerals of reference, there is shown in FIG. 1 a plastic heat sealing apparatus generally designated 1 for forming plastic filmstock into tubes or packages. The apparatus 1 includes a supporting frame 2 over which a plastic film is fed. There is provided a reel 3 of plastic film, such as, single ply or double ply saran, which may be supported on frame 2 or on a separate reel holder. Plastic film 4 is fed from reel 3 over a plurality of pulleys 5 which direct the film into the sealing portion of the apparatus. The film 4 is fed into the apparatus past a heat sealing shoe or plate 6 around which the film is folded to form a tube. After the film is folded into a tube it passes under heat sealing bar 7 which is heated to a temperature sufficient to cause the film to fuse. Sealing bar 7 is brought intermittently into contact with the lap joint of the plastic film on the sealing shoe or plate to form a longitudinal seam and thus produce a continuous plastic tube of indefinite length. If desired, the plastic tube can be provided with cross seams and cut to form bags having closed ends.

In FIG. 4 the heat sealing shoe or plate 6 is shown in more detail. This is simply a thick metal plate around which the film is lapped to form a tube and against which the film is pressed by heat sealing bar 7 to form a longitudinal seal and produce a plastic tube. In prior art apparatus for forming plastic tubing in this manner, the plastic film was supplied in a form in which it was pre-dusted, i.e., an antiblocking powder, such as, starch, chalk, talc, etc., was applied to the film prior to the film being rolled up on reel 3. Alternatively, the film may have been supplied in the form of a reel which was not pre-dusted but with an anti-blocking powder applied to the film as it was unwound from the reel. In both cases there was an excessive amount of dust released as the film was unwound at the reel end of the apparatus. In addition, the anti-blocking powder on the film tended to accumulate on the heat sealing shoe or plate 6 and sometimes would prevent a complete seam from being formed when heat sealer bar 7 was brought into contact with a lap joint on the film.

In this apparatus the anti-blocking powder is added to the film after the film is formed into a tube and sealed. Tube forming plate 6 is provided with a pair of small diameter metal tubes 8 (preferably of copper) which are of about the same outside diameter as the thickness of plate 6. Tubes 8 are secured to plate 6 by brazing or soldering and extend along the side of plate 6 and have their end portions 9 bent at the end of plate 6 to direct the flow of an anti-blocking powder throughout the interior of a tube which has been formed around plate 6 and sealed by heat sealing bar 7.

In FIG. 1 the system for applying an anti-blocking powder to the tube is shown somewhat diagrammatically and in FIG. 2 there is shown a more detailed view of the application of anti-blocking powder around the tube-forming plate 6. The apparatus is provided with a storage jar 10 for an anti-blocking powder, such as, starch, chalk, talc, or the like, which is supported on supporting frame 11. Compressed air from an air pressure source (not shown) is supplied through pressure regulator valve 12 and solenoid valve 13 through tube 14 leading into the powder storage jar 10. Compressed air blowing into powder storage jar 10 picks up the anti-blocking powder and carries it out through tubes 15 which are connected to tubes 8 as indicated at 16. Solenoid 13 is connected by wires 16 leading to control unit 17 which is shown diagrammatically. Control unit 17 includes the timer mechanism for indexing the feed of plastic film through the apparatus and for operating the heat sealing bar and the other electrically operated portions of the apparatus. The control mechanism 17 is arranged to operate solenoid 13 to permit air to inject an anti-blocking powder into the plastic tube each time the tube is indexed for further movement. In FIG. 2 there is shown in more detail the forming of the film around the sealing plate. Plastic film 4 is fed past pulley 5 and is formed around sealing plate or shoe 6. In FIG. 5 the forming of the film 4 around the sealing plate 6 to form a lapped joint 4a is seen in cross section. The anti-blocking powder is fed through tubes 8 and is injected into the interior of the formed plastic tube beyond the heat sealing bar 7. Heat sealing bar 7 moves into and out of engagement with the lapped seam 4a of plastic film 4 on the sealing plate 6 and is coordinated in its movement with the forward movement of the plastic film. This arrangement insures that the anti-blocking powder is supplied to the interior of the tube only after it has passed the heat sealing area. Whenever plastic films are sealed on this apparatus which have a tendency to stick to the sealing plate 6 the apparatus is modified by providing sealing plate 6 with a coating of Teflon (tetrafluoroethylene polymer) or similar material having a very low co-efficient of friction. A coating of Teflon on plate 6 would be so thin in relation to the thickness of the plate that it cannot be shown in the drawings.

What is claimed is:

1. In an apparatus for forming plastic film into tubular form which includes a forming plate, means to feed plastic film and fold film around said plate to form a longitudinally extending lap joint, and means to form a heat seal in said lap joint; the improvement which comprises means including at least one conduit extending along said forming plate to supply an anti-blocking powder past said forming plate and introduce said powder within a formed plastic tube beyond said heat sealing means.

2. An apparatus as defined in claim 1 in which said powder supply means includes a pair of conduits secured along said forming plate and having open ends to direct said powder into the formed plastic tube.

3. An apparatus as defined in claim 1 in which said powder supply means includes a storage container for said powder and compressed air means to blow said powder to the point of application.

References Cited

UNITED STATES PATENTS

| 2,634,459 | 4/1953 | Irons | 264—95 XR |
| 2,679,968 | 6/1954 | Richter | 164—466 XR |
| 3,065,097 | 11/1962 | Zupic et al. | 117—18 |
| 3,268,640 | 8/1966 | Gerber | 264—95 |
| 3,306,963 | 2/1967 | Wisseroth et al. | 264—95 |

EARL M. BERGERT, Primary Examiner.

G. W. MOXON II, Assistant Examiner.

U.S. Cl. X.R.

156—203, 218